United States Patent
Karam et al.

(10) Patent No.: US 12,458,231 B2
(45) Date of Patent: Nov. 4, 2025

(54) EXTENSIBLE BODY SENSOR NETWORK PLATFORM FOR WEARABLE AND IMPLANTABLE DEVICES

(71) Applicant: UNIVERSITY OF SOUTH FLORIDA, Tampa, FL (US)

(72) Inventors: Robert Anthony Karam, Temple Terrace, FL (US); Myles Joseph Keller, Thonotosassa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 617 days.

(21) Appl. No.: 17/980,518

(22) Filed: Nov. 3, 2022

(65) Prior Publication Data

US 2024/0148249 A1 May 9, 2024

(51) Int. Cl.
*A61B 5/00* (2006.01)
*H04L 9/40* (2022.01)

(52) U.S. Cl.
CPC .......... *A61B 5/0024* (2013.01); *A61B 5/0022* (2013.01); *H04L 63/0428* (2013.01)

(58) Field of Classification Search
CPC ..... A61B 5/0024; A61B 5/021; A61B 5/6802; A61B 5/68; A61B 5/6801; H04L 63/0428; G16H 50/30; G06F 3/0487
See application file for complete search history.

(56) References Cited

U.S. PATENT DOCUMENTS

| | | | |
|---|---|---|---|
| 9,084,536 B2 | 7/2015 | Yuen et al. | |
| 9,338,583 B2 | 5/2016 | Schmitt | |
| 2005/0090754 A1 | 4/2005 | Wolff et al. | |
| 2013/0317377 A1 | 11/2013 | Gupta et al. | |
| 2017/0224214 A1 | 8/2017 | Saigh et al. | |
| 2022/0269346 A1* | 8/2022 | Hussami | G06F 3/012 |

OTHER PUBLICATIONS

Andrews, A. and G. LLC, "Material Design Icons," GitHub Repository, Aug. 2020; 1-3. [Online]. Available: https://github.com/Templarian/MaterialDesign.
Cabello, R. "Three.js," GitHub Repository, Dec. 2020; 1-3. [Online]. Available: https://github.com/mrdoob/three.js.
(Continued)

*Primary Examiner* — Ernest Unelus
(74) *Attorney, Agent, or Firm* — HUSCH BLACKWELL LLP

(57) ABSTRACT

Methods and systems for body monitoring are disclosed. The methods and systems include: obtaining one or more sensor data arrays from one or more sensors. A first sensor data array of the one or more sensor data arrays includes multiple samples, the first sensor data array corresponding to a first sensor of the one or more sensors. generating a lifted dataset for the plurality of samples in the first sensor data array based on a lifting scheme; determine a sensor-specific threshold based on the first sensor; filtering the lifted dataset based on the sensor-specific threshold to produce a filtered dataset; generating a plurality of run-length encoding arrays based on the filtered dataset; concatenating the plurality of run-length encoding arrays to produce a packet; encrypt the packet; and transmit the encrypted packet. Other aspects, embodiments, and features are also claimed and described.

23 Claims, 10 Drawing Sheets

(56) References Cited

OTHER PUBLICATIONS

Chen, Shih-Lun, et al. "Wireless body sensor network with adaptive low-power design for biometrics and healthcare applications." IEEE systems journal 3.4 (2009): 398-409.

Dahl, R. "Node.js," GitHub Repository, Jan. 2021; 1-10. [Online]. Available: https://github.com/nodejs/node.

Fortino, Giancarlo, et al. "Enabling effective programming and flexible management of efficient body sensor network applications." IEEE Transactions on Human-Machine Systems 43.1 (2012): 115-133.

Gandhi, Vidhyotma, and Jaiteg Singh. "An automated review of body sensor networks research patterns and trends." Journal of Industrial Information Integration 18 (2020): 100132; 1-19.

Gope, Prosanta, and Tzonelih Hwang. "BSN-Care: A secure IoT-based modern healthcare system using body sensor network." IEEE sensors journal 16.5 (2015): 1368-1376.

Gravina, Raffaele, et al. "Multi-sensor fusion in body sensor networks: State-of-the-art and research challenges." Information Fusion 35 (2017): 68-80.

Grey, E. "FileSaver.js," GitHub Repository, Aug. 2020; 1-5. [Online]. Available: https://github.com/eligrey/FileSaver.js.

Hu, Mei, and Yongxi Wang. "Design of wearable wireless body area network monitoring system." 2020 IEEE 3rd International Conference on Information Systems and Computer Aided Education (ICISCAE). IEEE, 2020; 1-4.

Keller, M., Olney, B., & Karam, R. (Nov. 2021). A secure and efficient cloud-connected body sensor network platform. In IFIP International Internet of Things Conference (pp. 197-214). Cham: Springer International Publishing.

Kravets, I. "PlatformIO," GitHub Repository, Dec. 2020; 1-3. [Online]. Available: https://github.com/platformio.

Kwak, Kyung Sup, Sana Ullah, and Niamat Ullah. "An overview of IEEE 802. 15. 6 standard." 2010 3rd international symposium on applied sciences in biomedical and communication technologies (ISABEL 2010). IEEE, 2010; 1-6.

Mishra, Tejaswini, et al. "Pre-symptomatic detection of COVID-19 from smartwatch data." Nature biomedical engineering 4.12 (2020): 1208-1220.

Timberg, E. "Chart.js," GitHub Repository, Oct. 2020; 1-3. [Online]. Available: https://github.com/chartjs/Chart.js.

Yang, Xuechao, et al. "Securing body sensor network with ECG." Proceedings of the 14th International Conference on Advances in Mobile Computing and Multi Media. 2016.

\* cited by examiner

EXTENSIBLE BODY SENSOR NETWORK PLATFORM FOR WEARABLE AND IMPLANTABLE DEVICES

CROSS-REFERENCE TO RELATED APPLICATION(S)

N/A

STATEMENT REGARDING FEDERALLY SPONSORED RESEARCH

N/A

BACKGROUND

A Body Sensor Network (BSN) is a system consisting of low-power, often wireless sensor nodes that are used to monitor various aspects of the wearer's body as well as the environment surrounding them. However, a BSN platform has a limited capacity to process real-time sensor data. What are needed are systems and methods that address one or more of these shortcomings.

SUMMARY

The following presents a simplified summary of one or more aspects of the present disclosure, to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects of the present disclosure, methods, systems, and apparatus are disclosed. These methods, systems, and apparatus can include steps or components for: obtaining one or more sensor data arrays from one or more sensors. A sensor data array of the one or more arrays includes multiple samples. The sensor data array corresponds to a sensor of the one or more sensors. The methods, systems, and apparatus can further include: generating a lifted dataset for the plurality of samples in the sensor data array based on a lifting scheme; determine a sensor-specific threshold based on the sensor; filtering the lifted dataset based on the sensor-specific threshold to produce a filtered dataset; generating a plurality of run-length encoding arrays based on the filtered dataset; concatenating the plurality of run-length encoding arrays to produce a packet; encrypt the packet; and transmit the encrypted packet.

These and other aspects of the disclosure will become more fully understood upon a review of the drawings and the detailed description, which follows. Other aspects, features, and embodiments of the present disclosure will become apparent to those skilled in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. Similarly, while example embodiments may be discussed below as devices, systems, or methods embodiments it should be understood that such example embodiments can be implemented in various devices, systems, and methods.

DETAILED DESCRIPTION

The detailed description set forth below in connection with the appended drawings is intended as a description of various configurations and is not intended to represent the only configurations in which the subject matter described herein may be practiced. The detailed description includes specific details to provide a thorough understanding of various embodiments of the present disclosure. However, it will be apparent to those skilled in the art that the various features, concepts and embodiments described herein may be implemented and practiced without these specific details. In some instances, well-known structures and components are shown in block diagram form to avoid obscuring such concepts.

Figure 1:
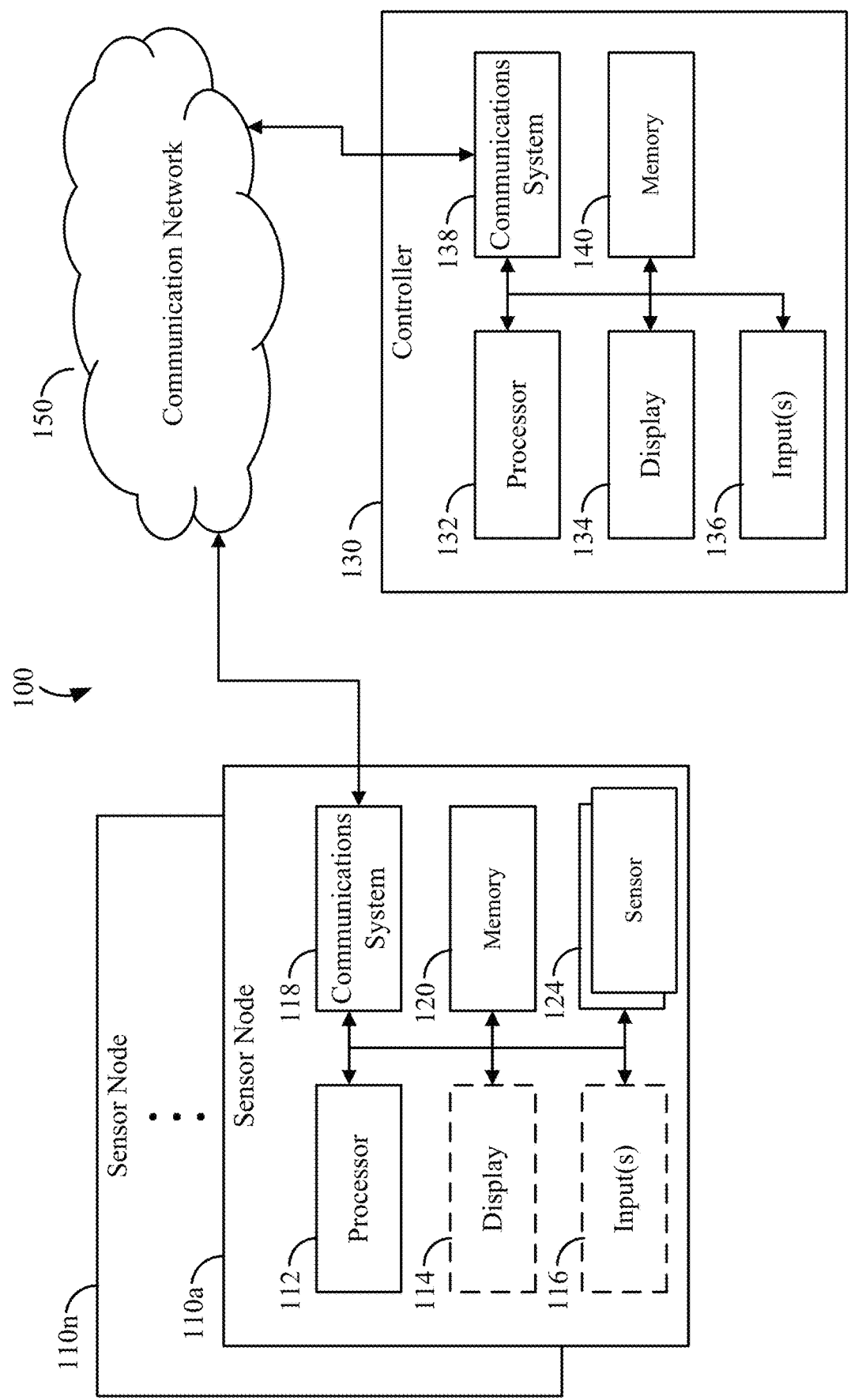
FIG. 1 is a block diagram conceptually illustrating a system or a body sensor network platform according to some embodiments.

FIG. 1 shows an example 100 of a system or a body sensor network (BSN) platform for monitoring various aspects of the wearer's body and the environment surrounding sensor nodes in accordance with some embodiments of the disclosed subject matter. The system is an extensible BSN platform that supports research and development of emerging wearable and implantable applications. As shown in FIG. 1, each of one or more sensor nodes 110a, 110n can obtain sensor data from one or more sensors 124 of the respective sensor node 110a, 110n, and can compress, packetize, and encrypt the sensor data and transmit a packet or sensor data to a controller 130 over a communication network 150. The controller can receive the one or more packets or sensor data from the one or more sensor node 110a, 110n and display various aspects including real-time three-dimensional visualization of the wearer's body and the environment surrounding the sensor nodes 110a, 110n.

In some examples, the sensor node 110a, 110n can report data up to the controller 130. As one non-limiting example, the sensor node 110a, 110n, can comprise a microcontroller hub, or other processor, for one or more physical or virtual sensors 124. For example, the sensor node 110a, 110n can include, but is not limited to, an inertial measurement unit (IMU) sensor chip (e.g., BNO080), a time-of-flight distance sensor chip (e.g., VL53L0X), wearable device, or any other suitable sensor node. In some examples, a sensor node 110a, 110n (e.g., IMU sensor chip) can include multiple sensors (e.g., an accelerometer, a gyroscope, and/or a magnetometer). In other examples, a sensor node 110a, 110n (e.g., distance sensor chip) can include one sensor (e.g., distance sensor). Thus, a sensor node 110a, 110n can include one or more sensors 124, some or all of which have different modalities (e.g., differing techniques, principles, or hardware for acquiring data) and/or different sample rates. In further examples, sensors 124 in a sensor node 110a, 110n can include sensors of various modalities, such as an accelerometer, a gyroscope, a magnetometer, a distance sensor, a stability detector, a stability classifier, a rotation vector sensor, light or optic-based sensor (e.g., heart rate or blood flow sensors), electrical based sensor (e.g., EKG/ECG patch, or other electrical sensor), or any other suitable sensor to monitor the wearer's body and/or the environment surrounding the sensor node 110a, 110n. In some embodiments, sensor nodes 110a, 110n may include various wearable or implanted sensors or actuators, relying on different sensing modalities, such as bladder pressure sensors, neuromodulation sensors/electrodes/stimulators, subcutaneous glucose sensors, cardiac implants, external sensors such as smart watches, temperature sensors, including body warmth, etc. The sensor node 110a, 110n can receive or collect sensor data from one or more sensors 124. In some instances, at startup, an initialization message consisting of a list of sensors being used and their configured parameters can be sent to the controller 130. Thus, when the controller 130 is restarted, the one or more sensor nodes 110a, 110n can be reassessed. If no initialization message is passed, the sensor nodes 110a, 110n can use the configuration parameters from the previous session. As one non-limiting example, during each session, nodes report their data asynchronously to the controller 130 using the WebSocket protocol using either wired or wireless communication:

In some examples, the sensor node 110a, 110n can include a processor 112. In some embodiments, the processor 112 can be any suitable hardware processor or combination of processors, such as a central processing unit (CPU), a graphics processing unit (GPU), an application specific integrated circuit (ASIC), a field-programmable gate array (FPGA), a digital signal processor (DSP), a microcontroller (MCU), etc.

In further examples, the sensor node 110a, 110n can further include a memory 120. The memory 120 can include any suitable storage device or devices that can be used to store sensor data (e.g., compressed/encrypted packets) from the one or more sensors 124, etc., that can be used, for example, by the processor 112 to perform compression, packetization, and/or encryption and to transmit sensor data to the controller 130 via communications system(s) 118, etc. The memory 120 can include any suitable volatile memory, non-volatile memory, storage, or any suitable combination thereof. For example, memory 120 can include random access memory (RAM), read-only memory (ROM), electronically-erasable programmable read-only memory (EEPROM), one or more flash drives, one or more hard disks, one or more solid state drives, one or more optical drives, etc. In some embodiments, the memory 120 can have encoded thereon a computer program for controlling operation of the sensor node 110a, 110n. For example, in such embodiments, the processor 112 can execute at least a portion of the computer program to perform one or more data processing tasks described herein transmit/receive information via the communications system(s) 118, etc. As another example, the processor 112 can execute at least a portion of process 200 described below in connection with FIG. 2. In some examples, the memory 120 can also include a sensor-modulated sample rate optimization function to modulate an internal sampling rate based on another sensor. For example, the processor 112 can execute the function to scale back the internal duty cycle proportionally to values from a reference value (of another sensor).

In further examples, the sensor node 110a, 110n can further include a communications system 118. The communication system 118 can include any suitable hardware, firmware, and/or software for communicating information over communication network 140 and/or any other suitable communication networks. For example, the communications system 118 can include one or more transceivers, one or more communication chips and/or chip sets, etc. In a more particular example, the communications system 118 can include hardware, firmware and/or software that can be used to establish a Wi-Fi connection, a Bluetooth connection, a cellular connection, an Ethernet connection, etc.

In further examples, the sensor node 110a, 110n can receive or transmit information from or to the controller 130 over a communication network 150. In some examples, the communication network 150 can be any suitable communication network or combination of communication networks. For example, the communication network 150 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard, such as CDMA, GSM, LTE, LTE Advanced, NR, etc.), a wired network, etc. In some embodiments, communication network 150 can be a local area network, a wide area network, a public network (e.g., the Internet), a private or semi-private network (e.g., a corporate or university intranet), any other suitable type of network, or any suitable combination of networks. Communications links shown in FIG. 1 can each be any suitable communications link or combination of communications links, such as wired links, fiber optic links, Wi-Fi links, Bluetooth links, cellular links, etc.

In a non-limiting scenario, all testing hardware used in the BSN platform can be connected via USB at least once for an initial flashing. The firmware for each device is compiled and pushed via USB connection using a crossplatform IDE (e.g., PlatformIO) and unified debugger for microcontrollers (μCs). After flashing is completed, USB can be used by devices defined as the controller 130 for transmitting BSN communication via serial to the browser front-end. If necessary, any device can use USB as a power source.

In a further non-limiting scenario, to maximize the platform's ability to effectively prototype and test a BSN, Wi-Fi can be used as the wireless communication protocol. Wi-Fi is resilient to inconsistent signal, has high data throughput, and makes communication between several sensor nodes 110a, 110n, the controller 130, and an external system running the virtual environment relatively simple to maintain. Devices designated as controller(s) 130 can be configured to host an ad hoc Wi-Fi network for sending and receiving data on the BSN, providing a medium through which sensor nodes 110a, 110n can communicate with their assigned controllers. This network also allows connections from any device with a modern web browser so that they may load the virtual environment, observe communication between devices, and change the configuration of the BSN in real-time.

In further examples, the sensor node 110a, 110n can further optionally include a display 114 and one or more inputs 116, one or more communication systems 118, and/or memory 120. In some embodiments, the display 114 can include any suitable display devices, such as a computer monitor, a touchscreen, a television, an infotainment screen, etc. In some embodiments, the input(s) 116 can include any suitable input devices and/or sensors that can be used to receive user input, such as a keyboard, a mouse, a touchscreen, a microphone, etc. In further embodiments, the input(s) 116 can be integrated in the sensor node 110a, 110n or separately connected to the sensor node 110a, 110n. However, due to limited system resources (e.g., memory, processing, bandwidth, energy, etc.), the sensor node 110a, 110n might not include a display 114 or one or more inputs 116.

In some examples, the controller 130 can include a microcontroller or processor providing a communication link between nodes 110a, 110n and a browser front-end. In a non-limiting example, the controller 130 can include the browser front-end to display sensor data in a modular multi-visualization environment in real-time. Here, the multi-visualization can refer to how this environment presents information using multiple distinct visualization methods, such as graphing dataset as well as rendering it in 3D. The front-end can be developed a client-side scripting language (e.g., JavaScript) with a large ecosystem of libraries and frameworks, because it is natively integrated into most web browsers. In other examples, the browser front-end can be located separately from the controller 130. For example, the browser front-end can be in any suitable client device connected to the communication network 150 and display sensor data received from the control 130 via the communication network 150.

The controller 130 can be a microcontroller having limited system resources. However, the controller 130 can be any suitable computing device or combination of devices, such as a desktop computer, a laptop computer, a smartphone, a tablet computer, a wearable computer, a server computer, a computing device integrated into a vehicle (e.g., an autonomous vehicle), a camera, a robot, a virtual machine being executed by a physical computing device, etc.

The controller 130 can include components similar to those in the sensor node 110a, 110n. For example, the controller 130 can include a processor 132 similar to the processor 112 of the sensor node 110a, 110n; a memory 140 similar to the memory 120 of the sensor node 110a, 110n; a communication system 138 similar to the communications system 118 of the sensor node 110a, 110n; a display 134 similar to the display 114 of the sensor node 110a, 110n; and input(s) 136 similar to the input(s) of the sensor node 110a, 110n. However, those components can perform different tasks than those of the sensor node 110a, 110n. For example, the communications system 138 of the controller 130 can receive sensor data or packet(s) from the one or more sensor nodes 110a, 110n and transmit the sensor data or packet(s) to the front-end. Also, the display 134 of the controller 130 as the front-end can display information in real-time using multiple distinct visualization methods. In some examples, the processor 132 with the memory 140 can handle any data pre-processing prior to transmitting to other controllers and/or clients. For example, the controller 130 can take the data returned by its assigned sensor nodes 110a, 110n, compress the data, encrypt the data, and upload the data to a could server.

In some examples, the controller 130 can be flexible. For example, any sensor node 110a, 110n can be the controller 130 by a parameter, or a controller 130 can be responsible for multiple nodes 110a, 110n. Thus, when each sensor node 110a, 110n, and the controller 130 are initialized, the parameter can determine which role the sensor node 110a, 110n plays in the BSN platform: "node," a μC acting as a hub for one or more physical sensors, or "controller," a μC acting as a primary communicator between nodes and any connections to the browser front-end.

Figure 2:
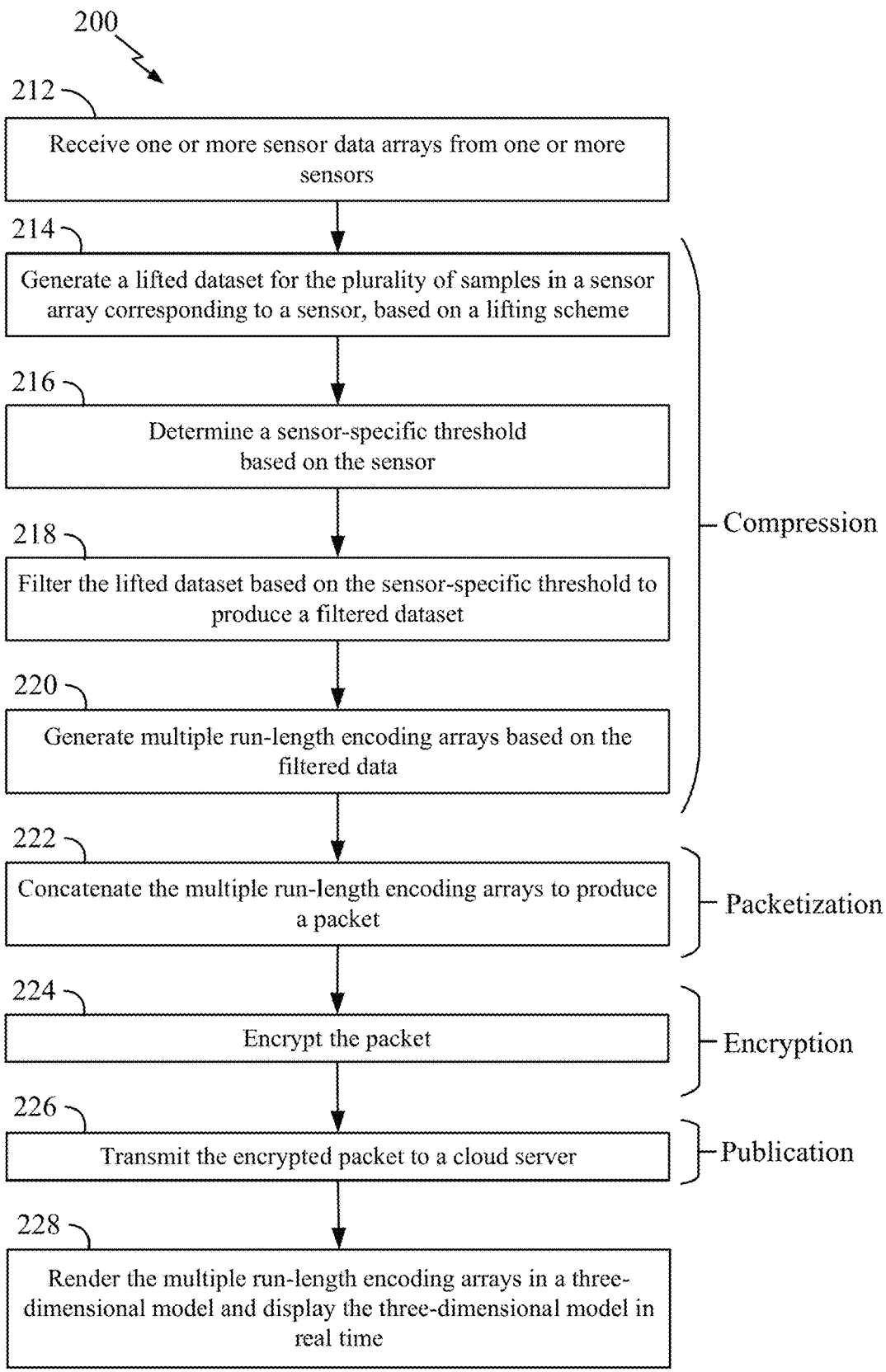
FIG. 2 is a flow diagram illustrating an example process for monitoring a body and surroundings according to some embodiments.
Figure 3:
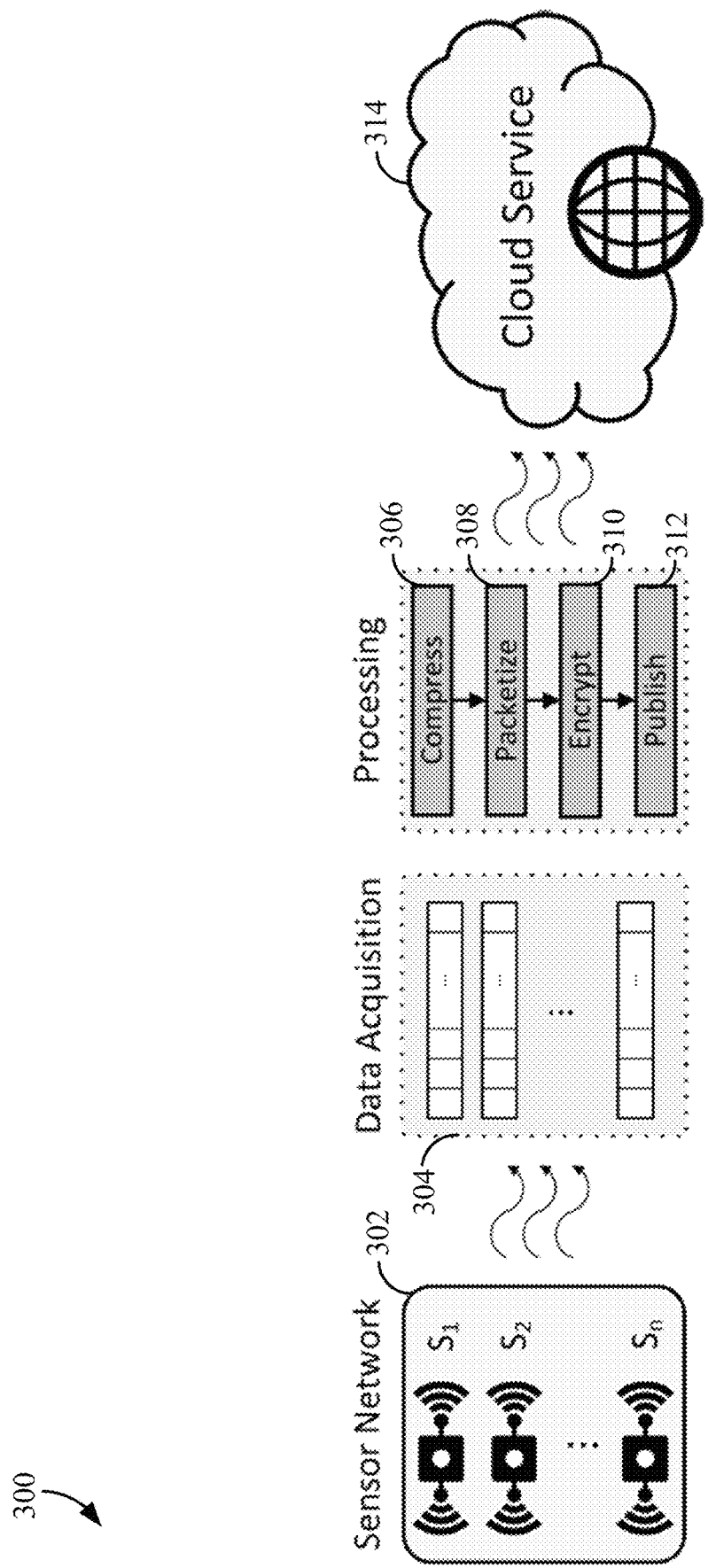
FIG. 3 is a flow diagram illustrating an example process for a body sensor network platform according to some embodiments.

FIG. 2 is a flow diagram illustrating an example process 200 for a body sensor network (BSN) platform to monitor wear's body and environments in accordance with some aspects of the present disclosure. As described below, a particular implementation can omit some or all illustrated features/steps, may be implemented in some embodiments in a different order, and may not require some illustrated features to implement all embodiments. In some examples, a sensor node 110a, 110n and/or the controller 130 in connection with FIG. 1 can be used to perform the example process 200. In further examples, a device can include the sensor node and the controller and perform process 200. However, it should be appreciated that any suitable apparatus or means for carrying out the operations or features described below may perform the process 200. FIG. 3 also shows a conceptual process of the BSN platform. The sensors 302 gather a fixed number of samples into individual arrays during data acquisition 304. Arrays are compressed 306 according to sensor-specific rules, concatenated into packets 308, encrypted 310 and finally published 312 to the cloud service 314.

At step 212, the process can receive or obtain one or more sensor data arrays from one or more sensors. A sensor data array can include multiple samples. The sensor data array can correspond to a sensor. In some examples, the one or more sensor data arrays can correspond to the one or more sensors. In some scenarios, a sensor can include a non-invasive wearable sensor, which can provide a convenient, non-invasive option for continuous, real-time sensing of physiological properties such as heart rate, movement, and blood pressure, among others. In other scenarios, a sensor can include a more invasive implantable device, which is designed to monitor internal physiological signals. In further scenarios, a sensor can include, but is not limited to, an Inertial Measurement Unit (IMU) sensor, an accelerometer, gyroscope, magnetometer, a time-of-flight sensor, a motion state classifier, a gravity sensor, a distance sensor, and any other suitable sensor.

In some examples, the process can provide a user-defined function to support dynamic sampling of a sensor based on an output of another sensor. That is, a sensor can dynamically change or adjust the sampling rate or sampling frequency of the sensor based on a sampling threshold and/or the output of another sensor. For the dynamic sampling of a sensor, the process can determine a sampling threshold based on the sensor. In some examples the sampling threshold is a sensor-specific or sensor-dependent threshold. For example, an accelerometer, a distance sensor, and a μC are initialized. Then, a piecewise function can be passed to the distance sensor that instruct it to scale back its polling duty cycle in proportion to the values returned by the accelerometer. This function, shown below, can analyze variance in readings taken during a t second window: $f(x, y)=y/10$, if $x < x_t$; and y, if $x \geq x_t$. If the readings exceed the sampling threshold $x_t$ of what we previously established as a normal magnitude reading of 1.25, then the distance sensor sampling rate y is divided by 10. The sampling threshold $x_t$ of 1.25 can be different for another sensor. In further examples, the process can adjust the sampling rate based on the activity level. For example, when there is no activity on an accelerometer, the process can reduce the sampling rate.

In some examples, a sensor data array can include multiple samples. In some examples, the process can group a predetermined or fixed number of samples (e.g., 16 samples) for a sensor data array. In some examples, the controller or a sensor can provide the fixed number of samples. In some examples, the process can obtain or receive raw samples in a time series returned from a sensor and group a fixed number of samples. In other examples, the process can receive categorical data from another sensor, which has built-in processing capabilities. For example, an accelerometer can return the X, Y, and Z components of acceleration, but a more sophisticated sensor in a sensor node can directly process this data and attempt to categorize the wearer's current physical activity such as standing, walking, running, jumping, or climbing stairs. In further examples, some sensors can return more then 8 categories. In further examples, implantable sensors (subcutaneous glucose sensor; bladder pressure; body warmth) can have their own operations (e.g., based on form factors, battery power, processing, etc.). The operations can impact the sample rate, radio, etc. For example, the heart rate might need to have high sample rate. Based on that, the process can adjust the sampling rate. In some examples, post-processing/signal conditioning can be done in/out of body.

Steps 214-220 can be considered a compression routine. The efficient compression routine for BSN data can meet the criteria: 1) Latency: computation of the compressed packet should not introduce considerable latency, 2) flexibility: compression should be suitable for varying packet sizes, as different BSN implementations can have different numbers and types of sensors with varying sampling rates, 3) energy efficiency: the total computation energy should not exceed the total energy savings due to encrypting and transmitting a smaller packet, and 4) tunability: if lossy, the compression can be configurable, such that different sensors can be compressed to comply with reconstruction constraints. The provided compression through steps 214-220 utilize, as an example, a lifting wavelet transform based on the Haar wavelet, with per-sensor configurable detail coefficient threshold and efficient run-length encoding scheme.

At step 214, the process can generate a lifted dataset for the multiple samples in the sensor data array based on a lifting scheme. For example, to compress the multiple samples, the process can divide the sensor data array into multiple even elements and multiple odd elements. For example, the sensor data array includes 16 samples (index number: sample 0, sample 1, . . . sample 15). In the example, even elements are sample 0, sample 2, sample 4, sample 6, sample 8, sample 10, sample 12, and sample 14. Odd elements in the example are sample 1, sample 3, sample 5, sample 7, sample 9, sample 11, sample 13, and sample 15. In other examples, samples can have different index numbers (sample 1, sample 2, . . . sample 16). Then, even elements can begin with sample 2 while odd elements can begin with sample 1. The process can replace an odd element of the multiple odd elements by subtracting a corresponding even element of the multiple even elements from the odd element and replace an even element of the multiple even elements by adding the corresponding even number and the replaced odd element divided by two. This step can be referred to as a predictive step where a linear interpolation function assumes that an odd element will exist at the mid-point of a line between the two even values adjacent to it. The odd element can be replaced by whatever difference results from subtracting the odd value's predicted value from its actual value. Similarly, the process can replace every odd element in the sensor data array. The predictive step can be shown as: $odd_{j+1,i} = odd_{j,i} - even_{j,i}$. Here, i and j indicate indices in the packet array. Then, the process can replace an even element of the multiple even elements by adding the corresponding even element and the replaced odd element divided by two. This step can be referred to as an update step. In some examples, the update step can replace each even element with an average of both the even element itself and its corresponding odd element. The transform can be complete once these steps have been performed on all pairs of even/odd elements. The update step can be shown as: $even_{j+1,i} = even_{j,i} + odd_{j+1,i}/2$. Then, the process can generate the lifted dataset for the sensor data array based on the replaced odd element and the replaced even element. The results of the lifting scheme can be easily reversible such that the original sensor signal can be reconstructed by adding the prediction value back to each odd element and interleaving the even and odd values into one sample array. In some examples, a Level 3 lifting Haar transform can be used. The transform can result in a transformed signal beginning with two approximation coefficients, which represent the average values of the first half and second half of the original 16-element array, followed by 2, 4, and 8 detail coefficients from levels 3, 2, and 1, respectively. In some examples, level 1 transform results in n/2 approximation and n/2 detail coefficients. When n=16, that is 8 and 8. Level 2 takes the 8 approximations and further approximates them in to 4 (level 2) approximations and 4 (level 2) detail coefficients. Finally, in level 3, the 4 (level 2) approximations are further approximated into 2 (level 3) approximations and 2 (level 3) detail coefficients. The resulting array can be represented as {[2 level 3 approximations][2 level 3 details][4 level 2 details][8 level 1 details]}. This DWT implementation with the Haar wavelet is computationally inexpensive, using few operations per sample and making it ideal for use in this context. In some examples, the process can generate multiple lifted datasets for the multiple sensor data arrays based on the lifting scheme.

At step 216, the process can determine a sensor-specific threshold based on the sensor. In some examples, the process can determine one or more sensor-specific thresholds corresponding to the one or more sensors in a sensor node. Due to differences in each sensor type and the fidelity used during reconstruction of different signals in different BSN applications, a unique threshold value can be defined for each sensor type. In some examples, the threshold is a predetermined value, which can be determined empirically. For example, the accelerometer may have a detail coefficient threshold of 3, i.e. any detail coefficient ≤3 is set to 0, whereas the gyroscope may have a detail coefficient threshold of 5. This can enable designers to easily trade-off between the compression ratio (and sub-sequent energy savings from reduced packet transmission), and reconstruction accuracy on a per-sensor basis.

At step 218, the process can filter the lifted dataset based on the sensor-specific threshold to produce a filtered dataset. For example, the filtered dataset can include a zero value for a detail coefficient of the lifted dataset in response to the detail coefficient having equal less than the sensor-specific threshold, or the detail coefficient of the lifted dataset in response to the detail coefficient having more than the sensor-specific threshold. The thresholding operation can effectively lead to higher compression ratios. Signals acquired from body sensors (accelerometers, gyroscopes, distance sensors, etc.) often exhibit gradual changes over brief timescales rather than abrupt ones. This yields sequential measurements with similar magnitudes. Such signals, in their transformed state, can have detail coefficients of generally smaller magnitude. A thresholding operation may be applied in the wavelet domain to the detail coefficients to effectively filter minor fluctuations, e.g. noise or less relevant data, making the signal more amenable to compression in subsequent processing stages. In particular, when applied to signals from sensors that do not experience high-magnitude changes, thresholding detail coefficients frequently produces results with large, adjacent groups of zeros in the wavelet domain. Thus, this can lead to higher compression ratios. Thus, after thresholding, the packets will generally be sparse, containing multiple segments of consecutive zeros, making it more amenable to compression.

At step 220, the process can generate multiple run-length encoding arrays based on the filtered dataset. For example, to generate the multiple run-length encoding arrays, the process can generate a first run-length encoding array and a second run-length encoding array. The first run-length encoding array can include one or more first values. Each first value can be indicative of a number of repetitions of a corresponding second value. The second run-length encoding array can include one or more second values in the filtered dataset. The one or more second values can correspond to the one or more first values. Thus, the one or more second values and the one or more first values are homogenous, and each run-length encoding array is homogenous. In some examples, repeat values in a signal can be represented by the number of times (e.g., first values) that value is repeated ($n_i$) in array n (e.g., the first run-length encoding array), and the value (e.g., second value) of the data itself, ($b_i$), in array b (e.g., the second run-length encoding array). As with other compression routines, random data, or highly variant data which are not amenable to compression, may result in packets larger than the original array. Thus, this can be considered when determining the array size constants and sensor thresholds, as these choices have a direct impact on the overall efficiency of the compression.

Figures 4A, 4B:
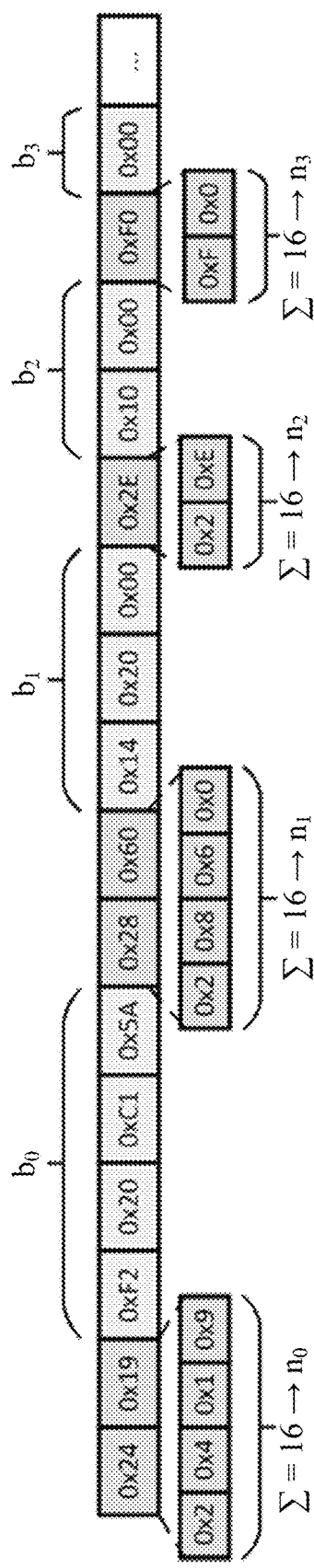
FIGS. 4A and 4B is an example conceptual run-length encoding sensor data with individual nibbles and expanded sensor data packets, respectively, according to some embodiments.

At step 222, the process can concatenate the multiple run-length encoding arrays to produce a packet. In some examples, the multiple run-length encoding arrays can be concatenate in an optimally space-efficient manner. As each array contains 16 samples from each sensor, there can be at most 16 repetitions $n_i$ for each value $b_i$. Hence, each element $n_i$ in the n array (e.g., the first run-length encoding array) can also be stored in 4-bit chunks. Moreover, in all but one special case, the total number of non-zero nibbles in the n array provide sufficient information for reconstruction of the b array (e.g., the second run-length encoding array) This is shown in FIGS. 4A and 4B. FIGS. 4A and 4B illustrate an example of RLE sensor data FIG. 4A shows individual nibbles of the first two bytes (0x2, 0x4, 0x1, and 0x9) sum to 16, which indicates that the n array is complete, and that there are 4 bytes in the b array—0xF2, 0x20, 0xC1, and 0x5A. These are expanded according to the run-length encoding decoding rules in $b_0$, shown in FIG. 4B, which shows the expanded sensor data packets. Other n/b array pairs show other possible results from the run-length encoding process, including a special case in $b_3$. For example, the first two bytes, 0x24, 0x19 indicate that the subsequent b array contains just 4 elements, as there are four non-zero nibbles totaling 16—the maximum size of the b array. The expanded array is shown in FIG. 4B, as array $b_0$. Following the 4 bytes of the array $b_0$, a new n array begins. While this also consists of 2 bytes, the least significant nibble in the 2nd byte is 0; hence, there are 3 non-zero nibbles whose values sum to 16. This indicates that the next three elements comprise the corresponding b array. In $n_2$, only 1 byte is needed to define the elements of the b array—0x2E—as the nibbles 0x2 and 0xE sum to 16. Hence, the next two bytes define the corresponding b array. Finally, in the special case of $n_3$, a 0x0 is encountered in the lower half of the byte, but the preceding nibble is 0xF. This does not sum to 16, but does represent a situation where there are 16 repeated values (in this case, 0x00) with just one element. If the lower nibble were 0x01, this would have indicated two bytes in the corresponding b array, rather than just one. Thus, there is no need to store the size of the n and b arrays, and it can be efficiently stored and perfectly reconstructed from this encoding. In the worst case, in which no element of b is repeated, the overhead from this encoding is exactly 50%. Due to the previously described wavelet transform and per-sensor thresholding approach, such a situation is extremely rare for the BSN data.

In some examples, the concatenation can further include an encoded categorical data. For example, multiple samples in a sensor data array can include categorical data. The process can encode the multiple samples of the sensor data array with atomic operations. Such categorical data might not be amenable to transform and thresholding, and there is no guarantee they will naturally repeat, and so compression may not provide any benefit. Thus, while the categorical data may be considered incompressible, the categorical data can be encoded in fewer bits with efficient atomic operations (e.g., shift and logic OR). To account for sensors which may return more than 8 categories, two subsequent readings from these sensors into one 8-bit byte, thus supporting up to $2^4=16$ categories for each sample. Thus, two subsequent samples of the multiple samples can be encoded into one encoded sample. Then, the process can concatenate the sensor data array including encoded categorical data and another sensor data array including multiple run-length encoding arrays to produce the packet. In further examples, multiple sets of encoded categorical data and/or multiple sets of multiple run-length encoding arrays can be concatenated to produce the packet.

Figure 5:
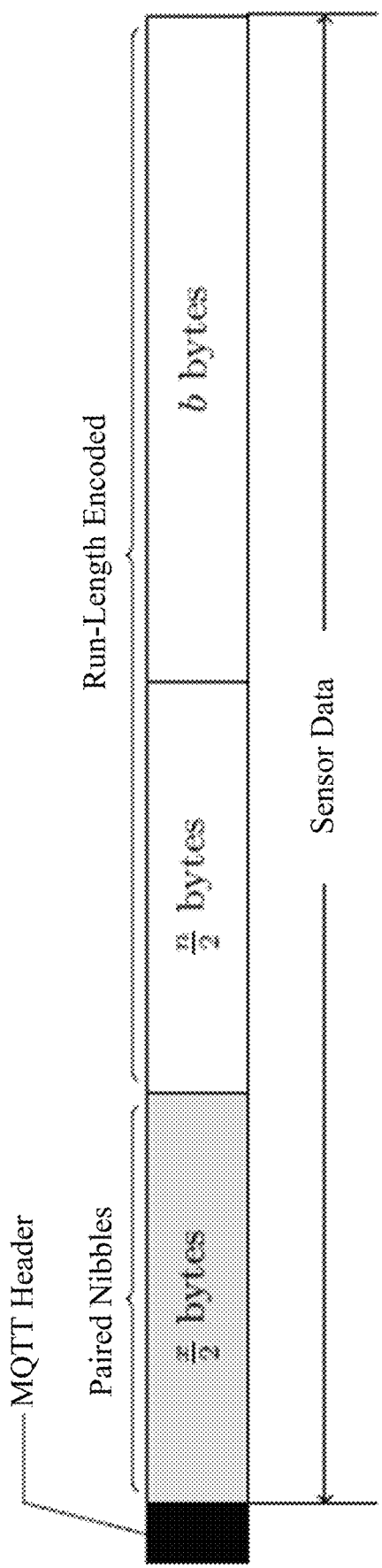
FIG. 5 is an example conceptual final packet according to some embodiments.

As one non-limiting example, the packet can include a concatenation of the encoded categorical data and/or concatenated run-length encoded arrays, as shown in FIG. 5. FIG. 5 shows an example conceptual final packet. The final packet can include paired nibbles of categorical sensor data, followed by concatenated run-length encoded arrays for the sensors. These arrays can represent thresholded data from the sensors in the wavelet domain. The n array (e.g., first run-length encoded array) can be packed into nibbles, while elements of the b array (e.g., second run-length encoded array) are then appended. The message queuing telemetry transport (MQTT) header and control bytes are prepended prior to transmission. The maximum size of the packet can depend on the number of categorical sensors, the number of raw data sensors, and the compression ratio for that data across the 16 samples. For example, with 3 categorical sensors, 16 samples of 1 byte each (unencoded) would use 48 bytes; with the proposed encoding, this is reduced to 24 bytes. With 10 raw data sensors, assuming 8 bits per sample, and 16 samples per sensor per packet, a total of 160 bytes are used. If there are no repeated values whatsoever, the proposed encoding would require 8 bytes per n array and 16 bytes per b array, for each sensor, or 240 bytes—an increase of 50%. If about half of the values are repeated, the n+b array size for each sensor would be about 12, for an overall size of 120 bytes, a savings of 25%. In practice, at least 33% of the values should be compressible in this manner to effectively reduce the size of the complete data packet comprised of the compressible sensor data.

At step 224, the process can encrypt the packet. For example, the packet can be encrypted by using one or more pre-computed round keys. In some scenarios, the limited computational capability and memory availability of the microcontrollers including the BSN platform can create a need for algorithms that can perform cryptographic operations reliably on systems with limited resources. Any suitable lightweight cryptography algorithms for use in IoT can be used. In the implementation, SPARX can be used. SPARX is a lightweight block cipher readily implemented on constrained platforms. Traditional block ciphers often have elaborated key schedules designed to work on 32-bit or create architectures. Using these ciphers on sub 32-bit architectures can cause register pressure to increase, forcing round keys to be either computed at runtime or pre-computed and stored in RAM. Even 32-bit systems are hindered by the S-box operations used by many modern encryption standards, further re-enforcing the need for a microcontroller-appropriate alternative.

SPARX can be a cipher for the BSN platform because it includes functionality to pre-compute the round keys as well as a variant designed specifically to work well on architectures of 32 bits or less. This is possible because all internal operations are implemented using 16-bit variables. The variant of SPARX can be referred to as SPARX 64-128, denoting that it is configured to encrypt a 64-bit block with a 128-bit key. Because residual bits that exceed the length of the information being processed must still be encrypted, having a smaller block size can be advantageous in situations where lower latency and energy are required. In general, this can reduce space wasted due to padding during encryption/decryption. This advantage becomes increasingly apparent when the size of the encrypted message approaches the theoretical minimum packet size of 56 bytes, which is evenly divisible by 64 bits, but not 128 or 256. If a 128-bit or 256-bit block were used, some of the benefits of compression would be undone due to the used padding, and the encryption operation can process additional irrelevant data.

At step 226, the process can transmit the encrypted packet. For example, the process can upload the encrypted packet to a cloud server. After compression and encryption of the sensor data has been completed, the data is then uploaded to a server (e.g., a cloud server, AWS server, etc.). This was accomplished with a server instance with the IoT platform enabled. For example, the process can use AWS IoT, which is a managed cloud platform for secure interactions between connected devices and cloud appliances. In order for microcontrollers on the BSN platform to communicate with the AWS IoT cloud platform, the process can configure the microcontrollers with the appropriate connection parameters and credentials. In some examples, the process can use a library to facilitate initializing and maintaining communication between the cloud servers and IoT cloud platform devices. In some examples, the inventors generated the necessary security certificates on the AWS website and exported them to a file included in the programming that was uploaded to each device, giving them provisioned access to AWS IoT cloud resources. IN further examples, AWS IoT can listen to incoming data from a configured microcontroller. Low-latency communication can be maintained with the server, such that cloud-based computation and feedback to BSN-based actuators would be feasible.

The communication protocol used internally by the AWS library can be based on MQTT, a lightweight, publish-subscribe network protocol running over TCP/IP. While MQTT is usually used to send and receive JSON data, it is also capable of passing raw binary data, which was our use case for this platform. In some examples, the process can publish MQTT data in raw binary form rather than JSON or string data to reduce message size overhead as much as possible. Since each reading was converted into a one-byte representation of its original value, this avoids recasting the data into ASCII and consuming additional space with the structuring of JSON.

At step 228, the process can render the multiple run-length encoding arrays in a three-dimensional model and display the three-dimensional model in real time. In some examples, step 228 can be performed in the controller. In other examples, step 228 can be performed in a sensor node, a client device, or a server. For example, the client device or the server can receive the encrypted packet from the controller or the sensor. The client device or the server can decrypt the encrypted packet and render the decrypted packet in the three-dimensional model.

In some examples, the BSN platform environment contains a browser-based front-end that processes and displays sensor data in a modular "multi-visualization" environment in real-time. In this context, multi-visualization refers to how this environment presents information using multiple distinct visualization methods, such as graphing a dataset as well as rendering it in 3D. The frontend can be developed with a client-side scripting language (e.g., JavaScript) with a large ecosystem of libraries and frameworks, because it is natively integrated into most web browsers. The majority of mobile browsers support JavaScript as well, allowing the frontend to run on portable devices with no additional configuration and similar functionality.

Figure 6:
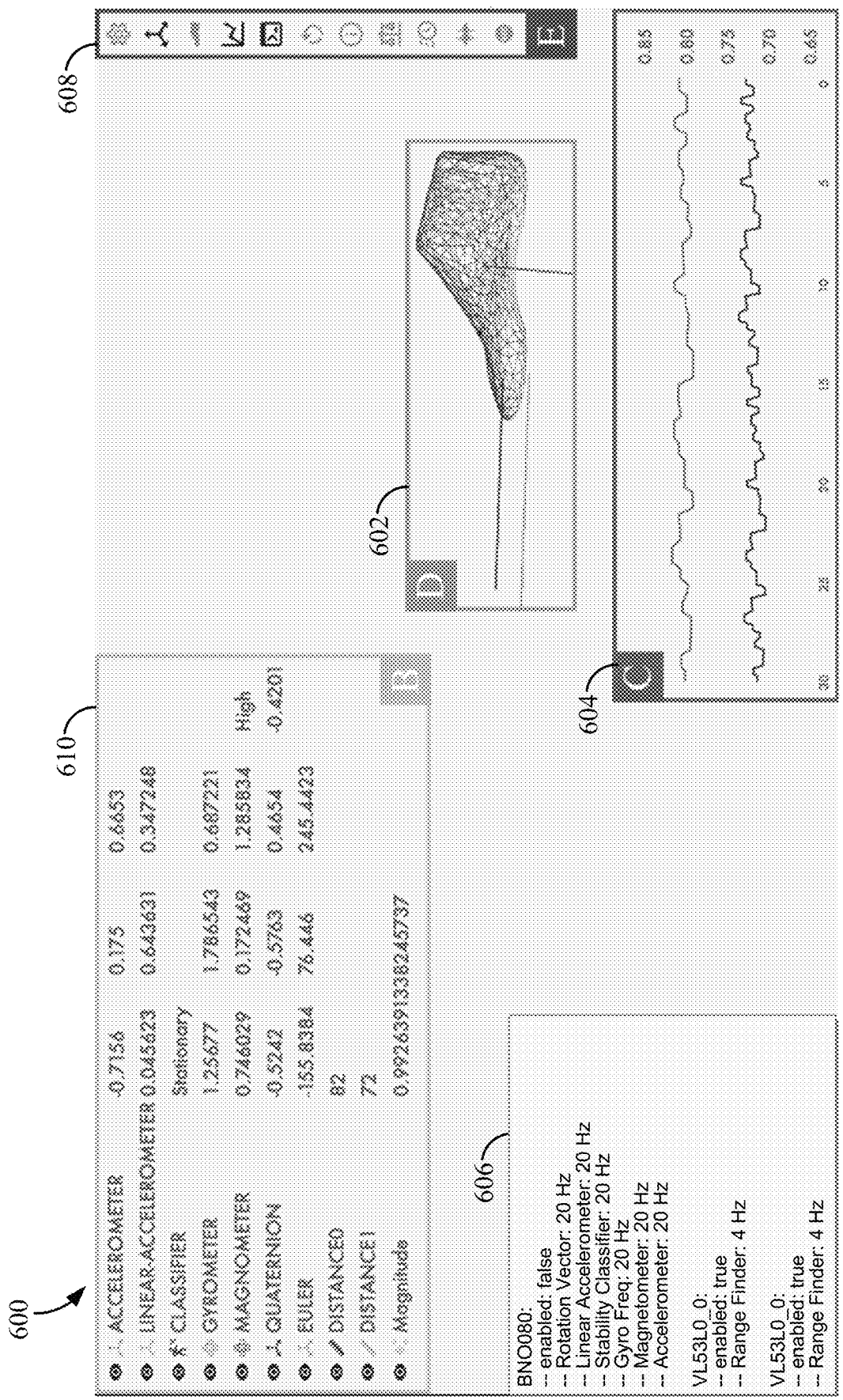
FIG. 6 is an example browser front-end modules of a body sensor network platform according to some embodiments.

FIG. 6 is an example browser front-end modules of a BSN platform. The example browser 600 displays visual elements of the front-end partitioned into the following modules that can be independently enabled/disabled in real-time: 3D rendering 602, 2D graphing 604, platform console I/O 606, configurable UI buttons 608, and information overview of sensor data 610.

1) 3D Rendering 602: The data stream (e.g., from one or more sensor nodes or a cloud server) can be parsed in the front-end and used for the real-time 3D visualization of sensor data that benefits from the additional perspective of virtual rendering as opposed to simply graphing the output. In some examples, the 3D rendering can be implemented using a cross-browser library (e.g., Three.js), and can display spatial location, orientation, and movement of sensors that provide inertial and orientation data, namely Inertial Measurement Unit (IMU) sensors. IMUs interface especially well with the cross-browser library because the output can include a quaternion, a rotation vector that is quicker to compute than traditional rotation matrices.

2) 2D Graphing 604: Graphing data is a way for visualizing data obtained from sensors displaying correlations and irregularities in large datasets. In some examples, a module can be included in the display 600 for displaying real-time graph data. This can be used concurrently with the 3D rendering (if applicable) and can provide a more comprehensive perspective of the information being gathered by the platform. This data can be streamed in real-time (e.g., using Chart.js) and can rely on a communication source (e.g., WebSocket) as the cross-browser library (e.g., Three.js).

3) Virtual Console 606: Being able to observe verbose log output can be useful in debugging and development situations, so the display can include a module to view console output from both sensors and nodes (if enabled) in an auto-scrolling virtual console. Communication data can be color-coded as determined by the origin of the message (node or controller) and context (info, warning, error) of the received messages. In some examples, an input box can be provided so that the user viewing the environment may also send messages to the controller directly.

4) UI Buttons 608: For commonly used commands, buttons can be used as shortcuts to quickly perform desired actions. In some examples, the display 600 can place a column along an edge of the environment allocating space for UI buttons that can be declared (e.g., in JavaScript), where the UI buttons are passed the parameters to determine the button's icon, the tooltip text that is viewable when hovering the cursor over the icon, and the command syntax that would otherwise require being typed into the console. The chosen icon alias can call a glyph from an open-source repository of icons (e.g., adhering to Google's Material Design guidelines of minimalism and universality). For example, passing the alias "mdi-motion-sensor" defines the icon from the Material Design Icon index that represents a motion sensor. Other buttons are preconfigured and only affect settings within the 3D rendering itself, such as toggling wire frame rendering mode on 3D objects or starting/stopping the streaming of real-time data to an external file.

5) Information Overview 610: The display 600 can quickly show or hide data as it is being analyzed, particularly in real-time. The process can implement a module that lists the name, icon, current value(s), and visibility state of each entity configured into the platform. Because some elements have three or more values that can be of different data types, the process can add a hovering tooltip for each value that shows a brief description of which value is currently under the cursor. This can save screen real estate and reduce visual complexity of the interface considerably when compared to having column labels for several sensors with different types of values. The name and icon data can be values that are passed into the sensors during their declaration in the platform's configuration. If the same name is used more than once, it is automatically appended with a number to avoid confusion and linking issues. Each preconfigured sensor type has a relevant default glyph assigned to it, but can be overridden during configuration. In some examples, the icon aliasing system can be the same as that used in the UI Button module, pulling from the Material Design Icon index. In further examples, the visibility button that precedes the name of each entity controls how it is visualized in the browser front-end. It is a three-stage button, and can enable and disable 3D rendering, 2D graphing, or both to completely hide visualization of that sensor's data.

6) Exporting Data: In addition to the support for real-time 3D rendering and modular multi-visualization, the process can support saving streamed data locally to files for review and/or further analysis. This module is triggered by a toggle button in the UI that uses the data export functionality (e.g., using FileSaver.js). Once clicked, the framework (e.g., Javascript framework) begins collecting the incoming socket datastream (e.g., WebSocket datastream) into a blob in memory. When the button is clicked a second time, the data contained in that blob is exported to a file (e.g., in either CSV or XLSX).

In further examples, when assigning a model to a sensor for 3D visualization, one of its real-world dimensions can be passed as a parameter, allowing the 3D environment to scale all rendered assets in proportion to that measurement by using the previously unitless 3D model as a reference. The inventors tested this by configuring a distance sensor to a µC, declaring a 3D model representing the object that the node is attached to, and passing the real-world X-dimension of that object in millimeters. The inventors recorded the values output by the 3D visualization of the distance sensor (represented as a line in 3D space) after they were scaled by the X-dimension value passed during initialization. By comparing the 3D object and distance measurement line values after scaling and observing that the values were proportionally accurate to the real-world objects size and observed line distance measurements, the inventors confirmed that the 3D environment is accurately scaling all rendered objects to the known reference value.

Figure 7:
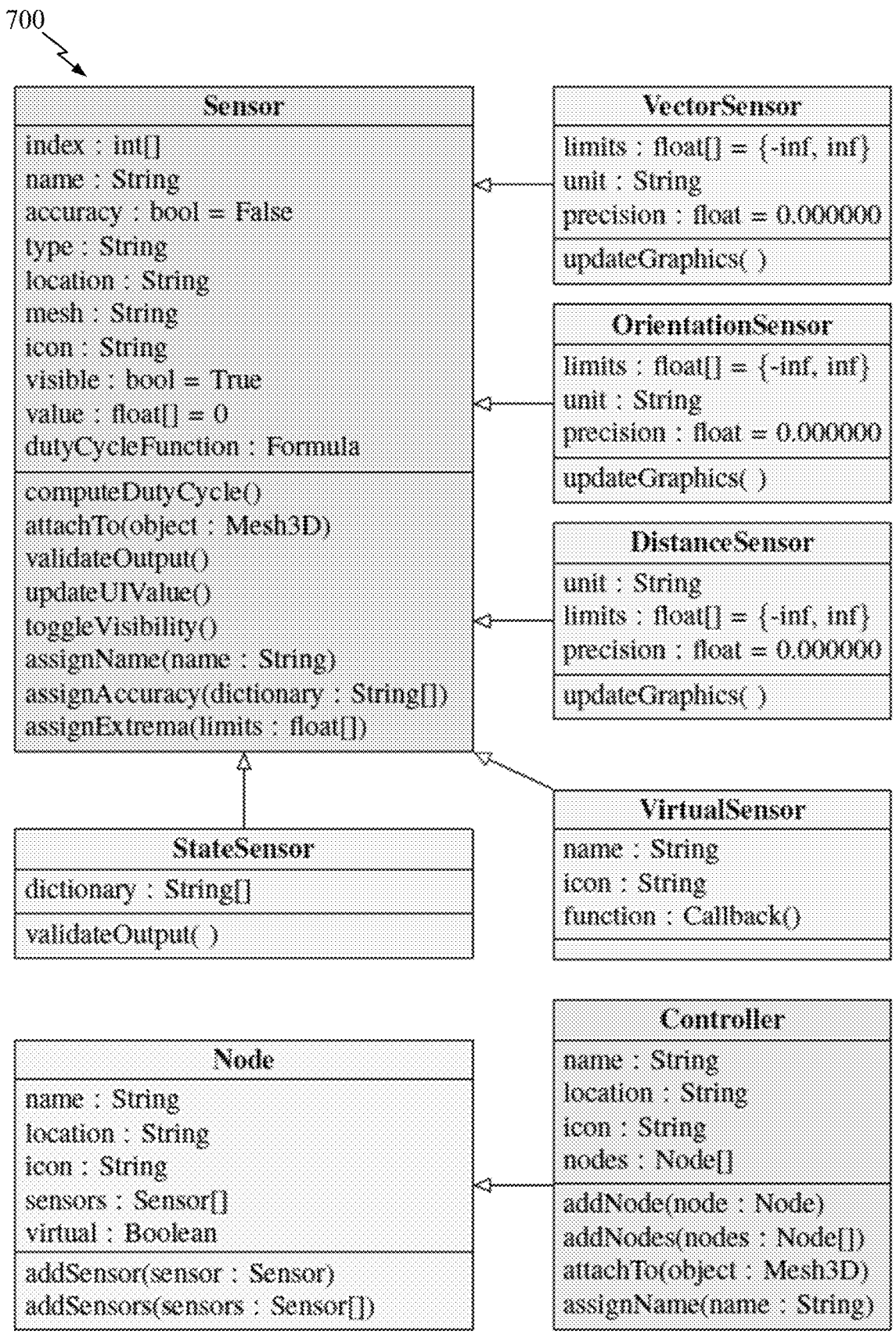
FIG. 7 is an example diagram demonstrating sensor and microcontroller class hierarchy and inherited properties of their sub-classes according to some embodiments.

In further examples, the BSN platform can allow the implementation of several common types of sensors used in wearable technology: inertial measurement, orientation, distance, state classification, and a configurable custom type for many others as shown in FIG. 7. FIG. 7 illustrates an example UML diagram demonstrating sensor and microcontroller class hierarchy and the inherited properties of their subclasses. In some examples, it is possible to declare any type of sensor easily because of the class construction used in the platform, where a simple constructor is used to declare the sensors that will be used. If a desired sensor is not already defined in the existing configurations, custom sensors can be created by passing the constructor attributes such as data pin numbers, pre-processing formulas, preferred communication protocol (I2C or SPI, if applicable), and sampling rate optimization characteristics. In some examples, due to the class hierarchy and inherited properties of their subclasses, the BSN platform can detect a sensor node and can automatically add or delete sensor node a single dashboard in the display to visualize the sensor data (with a three-dimensional model) in real-time.

In a non-limiting scenario, communication between sensor nodes and controllers on the BSN Platform can be managed a protocol (e.g., by the WebSocket protocol), which provides full-duplex communication channels over a single TCP connection, allowing the controller to communicate with the rendering environment (e.g., via WiFi). A direct USB connection can also be established for serial transmission of the WebSocket data, but uses the additional installation of the SerialPort package from Node.js. WebSocket data can be sent either in raw binary to conserve bandwidth and reduce transmitter power consumption or plaintext for ease of reading during debugging.

In some situations, a static polling rate is often unnecessary. For example, data streaming from an accelerometer would provide little utility if the wearer is not moving and would waste energy. Hence, dynamic sampling can be used where the sampling rate is modulated by the output of another sensor via a user-defined function. This function is passed as part of sensor declaration and identifies which other sensor is being observed and how the sampling rate is modulated in correlation with it.

In further examples, the BSN platform can include multiple sensor nodes and multiple controllers via the communication network 150 (shown in FIG. 1). In some scenarios, the BSN platform is dynamic such that the BSN can detect any sensor node or controller, which stops communicating with another sensor node or controller. Then, the BSN can use a secondary sensor to back up the loss of signals from the sensor node or controller, which lost the connection to another sensor node or controller. For example, the BSN platform can include an IMU chip including an accelerometer and another separate accelerometer sensor. The BSN platform can control the IMU chip not to use the accelerometer of the IMU chip due to the separate accelerometer sensor in the BSN platform. At some point, the separate accelerometer stops transmitting or receiving information to another sensor node or controller because the separate accelerometer does not have enough battery power or lose its connection to the communication network. The BSN platform can detect the loss of signals from the accelerometer and can turn on the backup accelerometer in the IMU chip to provide the accelerometer signals.

Experimental Setup: In some scenarios, the BSN testbed can include a microcontroller flashed with the platform firmware connected to an Inertial Measurement Unit (IMU) and two distance sensors. The IMU itself contains many separate sensing components, such as an accelerometer, gyroscope, and magnetometer, for a total of 21 sensors, which were sampled at 2 Hz. To explore the potential trade-offs in preparing data for publishing to the cloud, four separate packet processing schemes were tested in real-time, each consisting of two or more primary functions: 1) CP: concatenate and publish; 2) CCP: compress, concatenate, and publish; 3) CEP: concatenate, encrypt, and publish; and 4) CCEP: compress, concatenate, encrypt, and publish.

A National Instruments (NI) Analog Discovery (AD) 2 USB oscilloscope was used to gather all power measurements. A 2.2Ω shunt resistor was connected in series with the system power. Differential measurements were taken across the resistor at 50 MHz using the two analog inputs. A third, digital channel was used to trigger measurement; a digital GPIO pin on the microcontroller was asserted at startup, deasserted immediately before the function under test, and immediately reasserted once the function had returned. This capture window was recorded in 100 sequential measurements, which were aligned according to the recorded digital trigger signal and averaged together to improve signal quality. Execution of the compress( ), concatenate( ), and encrypt( ) functions is very consistent across measurements in different processing schemes; however the latency of the publish( ) function may depend on a number of external factors. To ensure as little variance as possible in measurements of the publish( ) function, the inventors ensured only the BSN was connected to the WiFi network, and placed the BSN in close proximity to the router. In total, two datasets were processed in real-time on the sensor nodes: one in which the BSN was in motion, and one while it was still. These are referred to as the walking and standing datasets. Together, these demonstrate the capabilities of the system when using different packet processing schemes under real-world conditions.

Compression Results: In general, the compression scheme worked well on most of the sensor data. Table 1 gives an overview of the compression ratios and resulting reconstruction error, computed as RMSE, as a percentage of the total sensing range when applied to the walking dataset. As each sensor type has a unique range of possible values, all of which are mapped to 8-bit values during processing, reporting the error in this manner provides a fair comparison between different sensor types. Furthermore, the inventors define the compression ratio (CR) as the percent reduction in size; hence, a CR of 25% indicates the compressed packet is 25% smaller than the original, while a CR of 75% indicates the compressed packet is 75% smaller than the original. Among the least compressible signal types in the dataset included the accelerometry signals (Accel. and LinAccel.), which used relatively high threshold parameter ($T_d$) ranges to achieve compression, and then resulted in moderate reconstruction error, e.g. about 5%. Since $T_d$ is tunable, it is feasible to adjust this parameter for different sensor types, or even signals from different measurement axes if desired. On average across all sensor types, this technique achieves a minimum of 28.5% compression with an average reconstruction error of 2.0%, typical compression of 46.4% with an average reconstruction error of 5.3%, and maximum compression of 53.2% with an average reconstruction error of 6.0%. By comparison, compression achieved on the standing dataset tends to be higher, with lower error. At all threshold levels which provide suitable compression for sensors while active, as in the walking dataset, maximum packet compression (81.3% or 68.8%, depending on the signal) is achieved at an average reconstruction error of under 0.1%. These results confirm the selection of the 3rd level Haar lifting wavelet transform and configurable threshold, which ultimately provided an acceptable balance between minimum sensor packet compression, processing time, and resulting reconstruction error for $T_d>0$.

TABLE 1

Compression (% reduction) and reconstruction error for various threshold values on data from the IMU and distance sensors on the walking dataset.

| Sensor | $T_d$ | CR (%) | Er (%) | $T_d$ | CR (%) | Er (%) | $T_d$ | CR (%) | Er (%) |
|---|---|---|---|---|---|---|---|---|---|
| | | X | | | Y | | | Z | |
| Accel. | 25 | 6.3 | 3.1 | — | — | — | 25 | 25.0 | 4.2 |
| | 50 | 43.8 | 6.0 | 50 | 6.3 | 10.1 | 50 | 50.0 | 6.4 |
| | 75 | 50.0 | 7.5 | 75 | 43.8 | 12.1 | 75 | 68.8 | 7.6 |
| | | Right | | | Left | | | | |
| Dist. | 8 | 12.5 | 1.3 | 8 | 6.3 | 0.0 | | | |
| | 12 | 50.0 | 1.6 | 12 | 6.3 | 0.0 | | | |
| | 15 | 68.8 | 1.9 | 15 | 6.3 | 0.0 | | | |
| | | Roll | | | Pitch | | | Yaw | |
| Euler | 8 | 25.0 | 1.0 | 2 | 31.3 | 0.3 | 2 | 12.3 | 0.3 |
| | 15 | 31.3 | 1.5 | 5 | 68.8 | 0.4 | 3 | 50.0 | 0.4 |
| | 20 | 68.8 | 2.2 | ** | ** | ** | 5 | 81.3 | 0.6 |
| | | X | | | Y | | | Z | |
| Gyro. | 25 | 6.3 | 3.6 | 28 | 25.0 | 3.9 | 25 | 12.5 | 3.7 |
| | 50 | 25.0 | 5.5 | 50 | 50.0 | 5.9 | 50 | 50.0 | 5.7 |
| | ** | ** | ** | ** | ** | ** | ** | ** | ** |
| | | X | | | Y | | | Z | |
| LinAccel. | 40 | 6.3 | 3.1 | — | — | — | 20 | 6.3 | 2.2 |
| | 50 | 12.3 | 6.9 | — | — | — | 40 | 31.3 | 5.0 |
| | 60 | 31.3 | 7.8 | — | — | — | 50 | 62.3 | 7.7 |
| | | X | | | Y | | | Z | |
| Magneto. | 1 | 81.3 | 0.0 | 1 | 81.3 | 0.0 | 1 | 81.3 | 0.0 |
| | ** | ** | ** | ** | ** | ** | ** | ** | ** |
| | ** | ** | ** | ** | ** | ** | ** | ** | ** |
| | | X | | | Y | | | Z | |
| Quatern. | 3 | 6.3 | 0.4 | 3 | 68.8 | 0.3 | 3 | 68.8 | 0.3 |
| | 5 | 25.0 | 0.6 | ** | ** | ** | ** | ** | ** |
| | 10 | 68.8 | 1.1 | ** | ** | ** | ** | ** | ** |

— no suitable threshold could be found for the maximum allowable error
** optimal compression already achieved at a lower threshold Packet Processing Efficiency Results: To ensure security of the final system and that the privacy of the end user is protected, the data gathered by the BSN must be encrypted in some way prior to publishing. Because the packet sizes are relatively small, we did not observe an appreciable difference in the latency of the publish( ) function, which was responsible for generating the final MQTT packet and transmitting the data to the remote server via WiFi. It is expected that, for a simpler communication protocol, differences in the actual transmission latency, as measured on the radio itself, would be more apparent, and the latency/energy savings due to reduced packet size would be significantly more pronounced. Therefore, while the CP and CCP variants are included as a reference, the more meaningful comparison is between CEP and CCEP.

Figure 8:
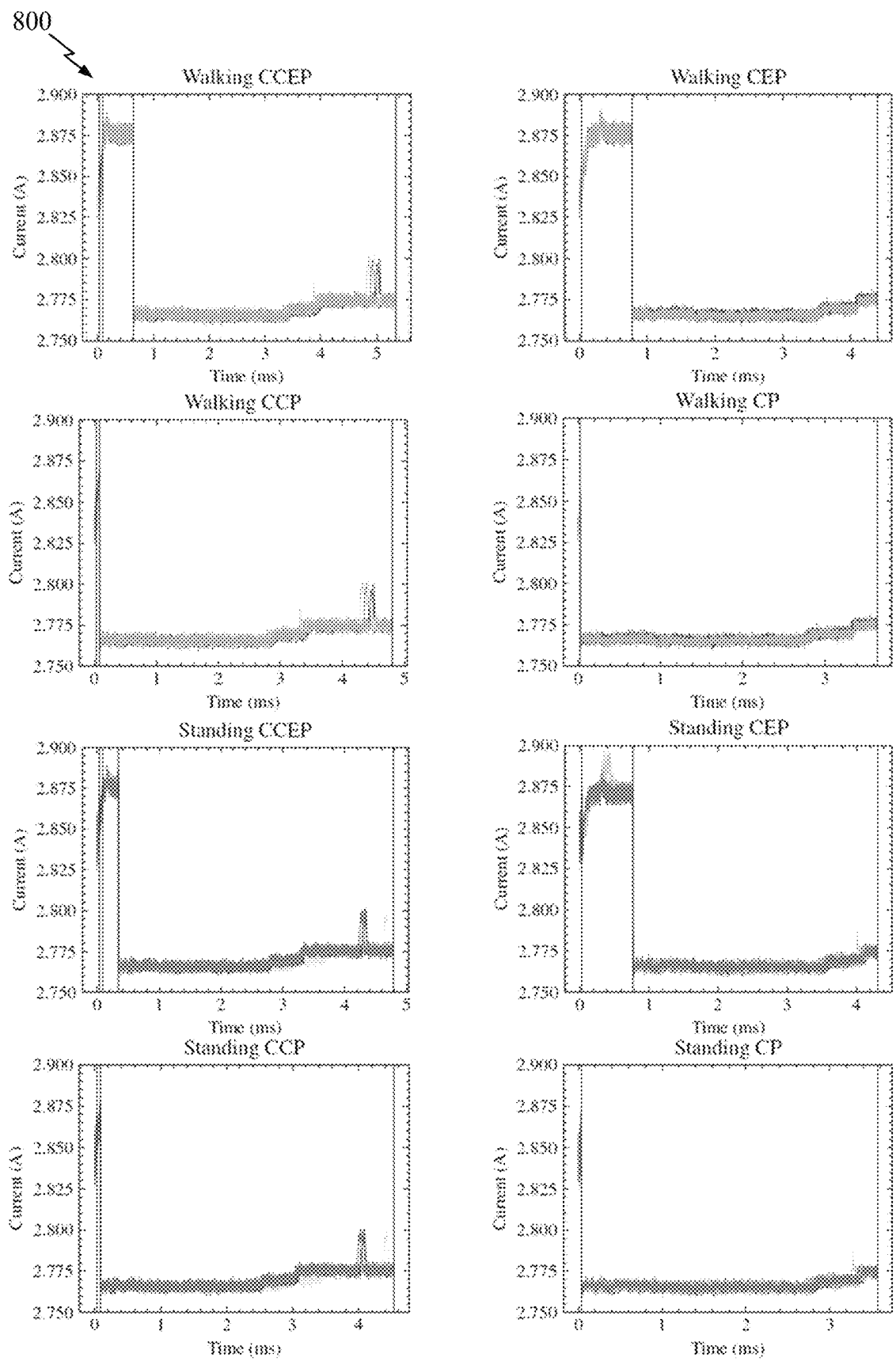
FIG. 8 illustrates power measurements for walking and standing data according to some embodiments.

FIG. 8 shows the total current consumption of the complete system during one full period of packet processing for the walking and standing datasets. Vertical lines in the graphs indicate the end of a processing stage; for example, in Walking CEP, the three vertical lines indicate the end of the Compression, Encryption, and Publishing stages. In this implementation, there is a high baseline power, but in practice, any number of common power saving strategies may be employed to improve battery life. While actively processing, there is about 100 mA in current over the baseline; this first segment includes all but the publish( ) function, which itself takes around 4 ms. Broadly, the results demonstrate that that the net energy efficiency is improved in CCEP when compared to CEP due primarily to the smaller packet size, translating to less data that must undergo encryption; this is most evident when comparing the relative EnergyDelay Product (EDP) difference between CCEP and CEP on the walking and standing datasets. Note that in these results, lossless compression ($T_d=0$) was used; in practice, a higher $T_d$ would improve compression, as shown in Table 1.

Figure 9B:
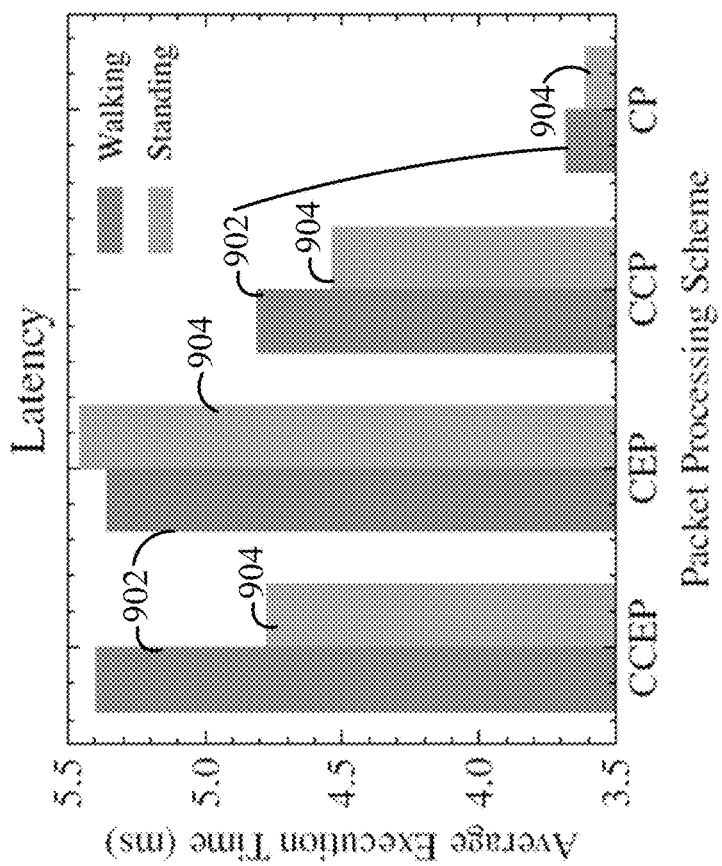
FIGS. 9A and 9B illustrate average energy efficiency and execution time for different packet processing scheme on the two datasets, respectively, according to some embodiments.
Figure 9A:
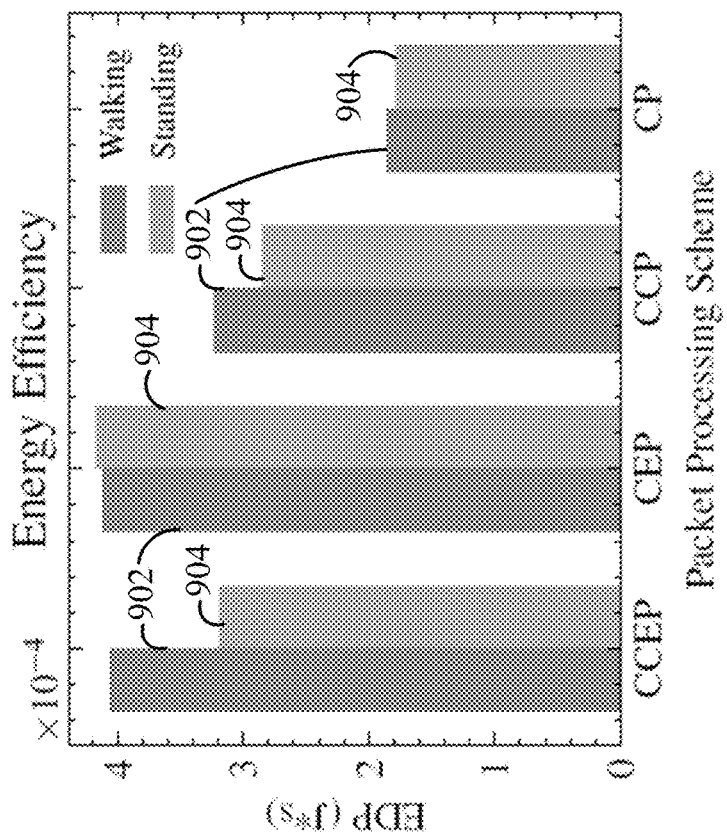

With this setup, the average time to encrypt a raw data packet in CEP was 737 μS, whereas the time required to encrypt a compressed packet was only 250 μS for the standing data and 531 μS on the walking data. Meanwhile, compressing the standing data required only 58 μS, while compressing the walking data required 66 μS. Because the concatenate function execution depends on the type of data (encrypted or raw), there is also variance here: for uncompressed data, concatenation required 3.5 μS, whereas for compressed walking and standing data, concatenation required 2.8 μS and 1.5 μS, respectively. When considering the latency and energy of just these three functions in preparing packets for publishing, there is a marked improvement in energy efficiency, 34% and 82%, for compressed data relative to uncompressed data, for the walking and standing datasets, respectively. Overall EDP, which includes publishing, is shown in FIG. 9A. FIG. 9A shows average energy efficiency for different packet processing schemes on the two datasets (walking 902 and standing 904). Note that for EDP in FIG. 9A, lower values indicate higher efficiency. Here, there is a significant improvement in energy efficiency due to compression in the standing dataset, and the primary driver—the improvement in latency—is clearly shown in FIG. 9B. FIG. 9B shows average execution time for different packet processing schemes on the two datasets (walking 902 and standing 904).

Figure 10:
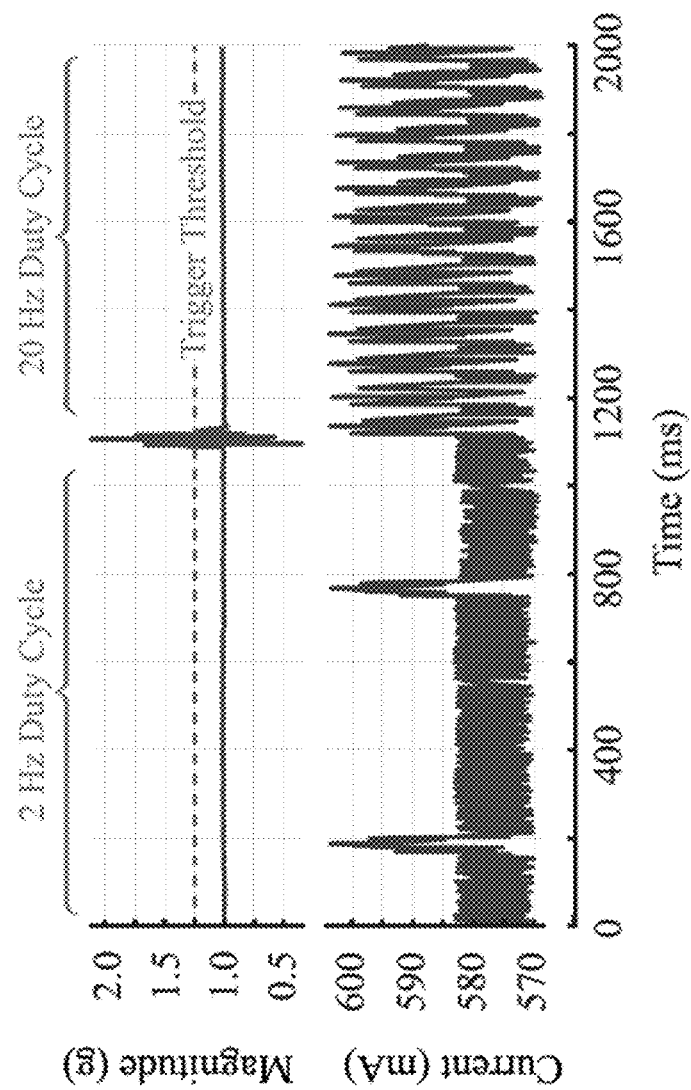
FIG. 10 illustrates an effect of sample rate modulation on current draw according to some embodiments.

Sampling Rate Optimization: As elaborated above, a sensor can dynamically change the sampling rate or sampling frequency of the sensor based on the output of another sensor. For example, an accelerometer, a distance sensor, and a μC are initialized. Then, a piecewise function can be passed to the distance sensor that instruct it to scale back its polling duty cycle in proportion to the values returned by the accelerometer. This function, shown below, can analyze variance in readings taken during a t second window: $f(x, y)=y/10$, if $x<x_t$; and y, if $x \geq x_t$. If the readings exceed the threshold $x_t$ of what we previously established as a normal magnitude reading of 1:25, then the distance sensor sampling rate y is divided by 10. Then, the energy consumption of the distance sensor can be recorded with an oscilloscope, once with power reduction techniques applied to the controller and again without any optimization. With power reduction techniques applied, when the accelerometer magnitude returned values below 1.25 g, the sampling frequency of the distance sensor decreased from its initialized value of 20 Hz to 2 Hz, reducing total current consumption to 50.82 mA. Without power reduction techniques applied, the system consumed 58.86 mA during the test. This is summarized in FIG. 10. When graphing measured distance values, returned distance readings, and power consumption of the two tests, we observed that modulation of sampling frequency in correlation to motion detected by accelerometer magnitude reduced power consumption by 14% without sacrificing sensor accuracy.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   obtaining a plurality of sensor data arrays from a plurality of sensors, the plurality of sensors comprising at least two sensors with different modalities and different sample rates, wherein a first sensor data array of the plurality sensor data arrays comprises a plurality of samples;
   generating a lifted dataset from the plurality of samples in of the first sensor data array based on a lifting scheme;
   determining a sensor-specific threshold for a first sensor corresponding to the first sensor data array;
   filtering the lifted dataset based on the sensor-specific threshold to produce a filtered dataset;
   generating a plurality of run-length encoding arrays based on the filtered dataset, each run-length encoding array being homogenous;
   concatenating the plurality of run-length encoding arrays to produce a packet;
   encrypting the packet; and
   transmitting the encrypted packet;
   wherein generating the lifted dataset based on the lifting scheme comprises:
      dividing the first sensor data array into a plurality of even elements and a plurality of odd elements;
      replacing an odd element of the plurality of odd elements by subtracting a corresponding even element of the plurality of even elements from the odd element;
      replacing an even element of the plurality of even elements by adding the corresponding even element and the replaced odd element divided by two; and
      generating the lifted dataset for the first sensor data array based on the replaced odd element and the replaced even element.

2. The method of claim 1, wherein a sampling rate of the plurality of samples is dynamically adjusted based on a sampling threshold.

3. The method of claim 2, further comprising:
determining the sampling threshold based on the first sensor.

4. The method of claim 1, wherein the lifted dataset utilizes a lifting scheme based on a Haar wavelet transform.

5. The method of claim 1, wherein the filtered dataset comprises:
a zero value for a detail coefficient of the lifted dataset in response to the detail coefficient having equal less than the sensor-specific threshold; or
the detail coefficient of the lifted dataset in response to the detail coefficient having more than the sensor-specific threshold.

6. The method of claim 1, further comprising:
encoding a second sensor data array of the plurality of sensor data arrays with atomic operations,
wherein the second sensor data array comprises categorical data.

7. The method of claim 6, wherein two subsequent samples of the plurality of samples are encoded into one encoded sample.

8. The method of claim 6, wherein concatenating the plurality of run-length encoding arrays further comprises:
concatenating the second sensor data array and the plurality of run-length encoding arrays to produce the packet.

9. The method of claim 1, wherein generating a plurality of run-length encoding arrays further comprises:
generating a first run-length encoding array of the plurality of run-length encoding arrays, the first run-length encoding array comprising: one or more first values; each first value indicative of a number of repetitions for a corresponding second value; and
generating a second run-length encoding array of the plurality of run-length encoding arrays, the second run-length encoding array comprising: one or more second values in the filtered dataset, the one or more second values corresponding to the one or more first values.

10. The method of claim 1, wherein the encrypting the packet uses one or more pre-computed round keys.

11. The method of claim 1, further comprising:
rendering the plurality of run-length encoding arrays in a three-dimensional model; and
displaying the three-dimensional model in real-time.

12. A system for body monitoring comprising:
a plurality of sensor nodes, each sensor node comprising one or more sensors, the plurality of sensor nodes comprising at least two sensors with different modalities and different sample rates;
a processor;
a memory having stored thereon a set of instructions which, when executed by the processor, cause the processor to:
obtain a plurality of sensor data arrays from plurality of sensor nodes, a first sensor data array of the plurality of sensor data arrays comprising a plurality of samples;
generate a lifted dataset from the plurality of samples of the first sensor data array based on a lifting scheme;
determine a sensor-specific threshold for a first sensor corresponding to the first sensor data array;
filter the lifted dataset based on the sensor-specific threshold to produce a filtered dataset;
generate a plurality of run-length encoding arrays based on the filtered dataset;
concatenate the plurality of run-length encoding arrays to produce a packet;
encrypt the packet; and
transmit the encrypted packet;
wherein to generate the lifted dataset based on the lifting scheme, the set of instructions, when executed by the processor, cause the processor to:
divide the first sensor data array into a plurality of even elements and a plurality of odd elements;
replace an odd element of the plurality of odd elements by subtracting a corresponding even element of the plurality of even elements from the odd element;
replace an even element of the plurality of even elements by adding the corresponding even element and the replaced odd element divided by two; and
generate the lifted dataset for the first sensor data array based on the replaced odd element and the replaced even element.

13. The system of claim 12, wherein a sampling rate of the plurality of samples is dynamically adjusted based on a sampling threshold.

14. The system of claim 13, wherein the set of instructions, when executed by the processor, further cause the processor to:
determine the sampling threshold based on the first sensor.

15. The system of claim 12, wherein the lifted dataset utilizes a lifting scheme based on a Haar wavelet transform.

16. The system of claim 12, wherein the filtered dataset comprises:
a zero value for a detail coefficient of the lifted dataset in response to the detail coefficient having equal less than the sensor-specific threshold; or
the detail coefficient of the lifted dataset in response to the detail coefficient having more than the sensor-specific threshold.

17. The system of claim 12, wherein the set of instructions, when executed by the processor, further cause the processor to:
encode a second sensor data array of the one or more sensor data arrays with atomic operations,
wherein the second sensor data array comprises categorical data.

18. The system of claim 17, wherein two subsequent samples of the plurality of samples are encoded into one encoded sample.

19. The system of claim 17, wherein to concatenate the plurality of run-length encoding arrays, the set of instructions, when executed by the processor, cause the processor to:
concatenate the second sensor data array and the plurality of run-length encoding arrays to produce the packet.

20. The system of claim 12, wherein to generate a plurality of run-length encoding arrays, the set of instructions, when executed by the processor, cause the processor to:
generate a first run-length encoding array of the plurality of run-length encoding arrays, the first run-length encoding array comprising: one or more first values; each first value indicative of a number of repetitions for a corresponding second value; and
generate a second run-length encoding array of the plurality of run-length encoding arrays, the second run-length encoding array comprising: one or more second values in the filtered dataset, the one or more second values corresponding to the one or more first values.

21. The system of claim 12, wherein the encrypting the packet uses one or more pre-computed round keys.

22. The system of claim 12, wherein the set of instructions, when executed by the processor, further cause the processor to:

render the plurality of run-length encoding arrays in a three-dimensional model; and display the three-dimensional model in real-time.

23. A system for body monitoring comprising:

a plurality of sensor nodes, each sensor node comprising one or more sensors, the plurality of sensor nodes comprising at least two sensors with different modalities and different sample rates;

a processor;

a memory having stored thereon a set of instructions which, when executed by the processor, cause the processor to:

obtain a plurality of sensor data arrays, from the plurality of sensor nodes, a first sensor data array of the one or more sensor data arrays comprising a plurality of samples;

encode a second sensor data array of the one or more sensor data arrays with atomic operations, wherein the second sensor data array comprises categorical data;

divide the first sensor data array into a plurality of even elements and a plurality of odd elements;

replace an odd element of the plurality of odd elements by subtracting a corresponding even element of the plurality of even elements from the odd element;

replace an even element of the plurality of even elements by adding the corresponding even element and the replaced odd element divided by two;

generate a lifted dataset for the first sensor data array based on the replaced odd element and the replaced even element, determine a sensor-specific threshold for a first sensor corresponding to the first sensor data array;

filter the lifted dataset based on the sensor-specific threshold to produce a filtered dataset;

generate a plurality of run-length encoding arrays based on the filtered dataset;

concatenate the second sensor data array and the plurality of run-length encoding arrays to produce a packet;

encrypt the packet; and transmit the encrypted packet.

* * * * *